United States Patent [19]
Anderson

[11] 3,828,471
[45] Aug. 13, 1974

[54] AGRICULTURAL MULCH FILMS ADAPTED FOR PLANT PENETRATION

[75] Inventor: Bernard Fornelius Anderson, West Chester, Pa.

[73] Assignee: E. I. dePont de Nemours and Company, Wilmington, Del.

[22] Filed: Feb. 25, 1972

[21] Appl. No.: 229,488

Related U.S. Application Data

[63] Continuation-in-part of Ser. No. 60,724, Aug. 3, 1970, Pat. No. 3,673,134.

[52] U.S. Cl............... 47/9, 117/138.8 E, 260/4 R, 260/5
[51] Int. Cl........................... A01q 7/00, B44d 5/00
[58] Field of Search....... 117/138.8 E; 47/9, DIG. 7; 260/4 R, 5

[56] References Cited
UNITED STATES PATENTS

| | | | |
|---|---|---|---|
| 2,702,256 | 2/1955 | Trachet............................ | 117/138.8 |
| 3,024,211 | 3/1962 | Daly......................................... | 260/4 |
| 3,070,462 | 12/1962 | McConnell et al.............. | 117/138.8 |
| 3,274,731 | 9/1966 | Vigneault et al.......................... | 47/9 |
| 3,320,695 | 5/1967 | Moore .......................... | 260/29.8 X |
| 3,412,058 | 11/1968 | Boyer..................................... | 260/4 |
| 3,454,510 | 7/1969 | Newland et al........................... | 47/9 |
| 3,496,125 | 2/1970 | Boyer et al. ........................... | 260/4 |

*Primary Examiner*—William D. Martin
*Assistant Examiner*—Sadie L. Childs

[57] ABSTRACT

Films prepared from ethylene polymer-hydrocarbon elastomer blends are coated with petroleum derived rubber processing and extender oils. These films degrade more rapidly and provide for easier plant penetration than untreated films.

5 Claims, No Drawings ial mulch films adapted for plant penetration

RELATED APPLICATIONS

This application is a continuation-in-part of Ser. No. 60,724 entitled "Agricultural Mulch," filed Aug. 3, 1970, now U.S. Pat. No. 3,673,134.

BACKGROUND OF THE INVENTION

Plastic films have been found to be very effective ground coverings for fields containing newly planted seeds. The films serve to protect the plants from extreme temperatures and drought and are useful in controlling weeds. Films have also been used to reduce surface crusting, thereby improving seed germination and seedling emergence. The color of the film can also be used to regulate the amount of light reaching the soil surface. When the film is black, no light passes through and when clear almost complete light transmission occurs.

In order that a film be effective as a ground covering it must have a balance of several important properties. The film must be sufficiently strong and flexible that it can be handled and laid out over large surface areas by use of a machine without rupture or tearing. The film must not, however, be so strong that it prevents plant breakthrough, i.e., penetration of the newly emerged seedling through the film. Finally, after the film has served its purpose at the end of the growing season, it must degrade to the point that it is easily disposed of merely by plowing into the soil. This avoids the laborious work of picking up the film or burning it.

While films have been suggested for use as mulches for crops, such as those described in U.S. Pat. Nos. 3,320,695 to Moore and 3,274,731 to Vigneault, none has been found which has an adequate balance of the important properties mentioned above.

SUMMARY OF THE INVENTION

This invention provides agricultural mulch films which are sufficiently tough and flexible to readily be placed as ground cover but yet degrade rapidly enough to permit seedling penetration upon seed germination.

In practicing this invention, films prepared from polyethylene-hydrocarbon elastomer blends are coated with a petroleum-derived rubber processing and extender oil. The oil is preferably applied to the film just prior to film placement as a ground cover. The elastomer component of the film absorbs the oil, softening the film to lessen required seedling pressure for film penetration.

Preferred films are those consisting essentially of a blend, in parts by weight per 100 parts of blend, of:

a. about 50 to 75 parts of polyethylene or a copolymer of ethylene with up to about 5% by weight of a $C_3$-$C_{10}$ α-olefin, b. about 25 to 50 parts of hydrocarbon elastomer, c. about 0 to 30 parts of paraffin wax.

DETAILED DESCRIPTION OF THE INVENTION

Agricultural mulch films are prepared by coating films prepared from polyethylene-hydrocarbon elastomer blends with a petroleum-derived rubber processing and extender oil. The coating operation is conducted concurrent with placement over the seed bed to be protected or shortly after film placement, taking advantage of the inherent film strength while placing the film. The elastomer component in the film absorbs the coating oil, softening the film and thus decreasing the pressure required to rupture the film.

The term "hydrocarbon elastomer" as used herein encompasses such rubber-like materials as natural rubbers, butadiene-styrene copolymers, polybutadiene, butyl rubbers, cis-polyisoprene, ethylene/propylene copolymers, and the like. Representative grades of natural rubber which may be used include include ribbed smoked sheets, thick pale crepes, thin pale crepes, estate crepes, and the like as described in Morton, "Introduction to Rubber Technology," Reinhold Publishing Corp., New York, N.Y. The preferred grade of natural rubber for use in this invention is ribbed smoked sheet.

The hydrocarbon elastomeric "ethylene/propylene copolymers" as used herein include dipolymers of ethylene and propylene and terpolymers of ethylene, propylene, and a non-conjugated diene such as 1,4-hexadiene. The ethylene/propylene copolymers contain about 30–75 weight percent ethylene, about 60–20 weight percent propylene, and 0–10 weight percent nonconjugated diene. They are rubbery and substantially amorphous, i.e., they have less than 5 percent crystallinity as determined by differential thermal analysis. Parent application Ser. No. 60,724 discloses such copolymers which may be used as the hydrocarbon elastomer component in films which are coated in accordance with the present invention.

Paraffin wax may also be included in the blends. These waxes are benzene-soluble and generally are long-chain saturated hydrocarbons containing about 15–30 carbon atoms. The preferred waxes have a specific gravity of about 0.880–0.915 and a melting point of about 47°–65°C. Paraffin wax is not generally added in excess of 30 percent by weight as the film will become too brittle to permit handling.

Polyethylene polymers are blended with the aforementioned elastomers, optionally with paraffin wax and either with or without additional additives, and the blend is subsequently processed by conventional apparatus to prepare the films. The polyethylene polymer used in preparing the film may be high pressure low density branched polyethylene, low pressure high density linear polyethylene, or copolymers of ethylene with up to 5 percent by weight of a $C_3$-$C_{10}$ α-olefin such as propylene, 1-butene, or 1-pentene. The polyethylenes used normally have densities of about 0.91 to 0.98 gram per cc. at 25°C. Branched polyethylene having a density not greater than 0.93 gram per cc. at 25°C. is preferred. The polyethylene is used in the amount of about 50–75 parts by weight per 100 parts of the blend. Detailed descriptions of methods for preparing both branched and linear polyethylene are given in R. A. V. Raff and K. W. Doak, "Crystalline Olefin Polymers," Part I, Interscience Publishers, New York, N.Y., 1965.

In making the films, the components described above are blended into a homogenous mass by routine mechanical means used in the rubber industry such as internal mixers. Banbury mixers are particularly effective. The resulting blend can then be fabricated into a film by extrusion through a slit die. The film is taken up on a roll as it leaves the die. If desired, the thickness of the film can be reduced by drawing on a cold roll. Other apparatus known in the art can also be used.

The films are coated with petroleum derived rubber processing and extender oils which are subsequently absorbed by the elastomer film component. These oils are well known in the art and are generally described in Sunoco Technical Bulletin 88, revision 2, copyright 1966, published by the Sun Oil Company. Any such oil which is compatible with the elastomer component of the film can be used. Representative oils are naphthenic oils such as "Shellflex" 412, paraffinic oils such as "Citgo" 90103, aromatic oils such as "Sundex" 790, liquid petrolatum, and mineral oil. Liquid petrolatum is a mixture of liquid hydrocarbons soluble in ether, benzene, and chloroform and having a specific gravity of about 0.828–0.905 (25°C.). Mineral oil is a refined petroleum distillate well known in the art. While the rate of oil application may vary with the particular oil and film selected for use, the rate will normally be between 2 and 4 grams of oil per square foot of film surface. Quantities of oil in excess of 4 grams per square foot will generally not expedite film softening, while generally quantities less than 2 grams per square foot will not give complete coverage of the film surface.

Since the rate of film degradation will depend on the particular film composition and coating oil used, one can select a film-oil system adapted for the particular crop being raised. Thus, for tender seedlings with low growing force such as onions, melons, and cabbage, the proportion of polyethylene in the film is usually decreased and the proportion of elastomer is usually increased. Paraffin wax can also be added to render the film more easily penetrated. For hardier seedlings with a high growing force, such as cotton, peas, and asparagus, the polyethylene proportion can be increased and the elastomer proportion decreased. Paraffin wax will be used in lesser proportions, if at all.

In general, it has been found that films containing the same portion of an EPDM copolymer, styrene-butadiene rubber, or natural rubber will yield roughly equivalent results when coated with oils, while films with the same proportion of butyl rubber will degrade somewhat more slowly. Inclusion of paraffin wax has been found to expedite the decrease in film strength for all elastomer-polyethylene films, as has increasing the ratio of elastomer to polyethylene.

Preferred films are those consisting essentially of a blend, in parts by weight per 100 parts of blend, of:
  a. about 50 to 75 parts of polyethylene or a copolymer of ethylene with up to about 5 percent by weight of a $C_3$–$C_{10}$ α-olefin,
  b. about 25 to 50 parts of hydrocarbon elastomer, and
  c. about 0 to 30 parts of paraffin wax.

Especially preferred films, when tender seedlings are to be protected by the film mulch, are those consisting essentially of a blend, in parts by weight per 100 parts of a blend, of:
  a. about 16–40 parts of polyethylene or a copolymer of ethylene with up to about 5 percent by weight of a $C_3$–$C_{10}$ α-olefin,
  b. about 10–50 parts of a substantially amorphous ethylene-propylene copolymer,
  c. about 15–30 parts of natural rubber, and
  d. about 20–26 parts of paraffin wax. Formation of the latter films is disclosed in copending Ser. No. 60,724, filed Aug. 3, 1970.

While the aforedescribed oils may be applied to the film substrate at any time, it is advantageous to coat the film just prior to film placement, concurrent with film placement, or shortly after film placement. These preferred procedures permit placement of the film while it still possesses its inherent strength. It will be recognized, however, that if the particular film-oil mulching system selected gives a slow decrease in film strength, considerable time can lapse between application of the oil and placement of the film over a seed bed without the necessity of special techniques to prevent film rupture during placement. Conversely, if the selected system gives a rapid decrease in film strength, it may be necessary to coat the film subsequent to its placement.

A preferred method of film coating and placement utilizes apparatus which unwinds the film from a film roll, applies the oil, and then affixes the coated film on soil in which seeds have just been planted. In one embodiment film 1 mil thick by 6 ¼ inches wide is unwound from a film roll and onto a 14 inch × 5 inch tire rim which has a 1/2inch thick by 5 inches wide sponge insert. The sponge rests on the inner shoulders of the rim and between the rim edges. As the rim is rotated or rolled on a seed bed, the rim edges make shallow furrows in the soil. Film is drawn off the roll by the sponges as the wheel rotates and contoured down into the furrows. When the film has just been pushed into the furrows, a spray of oil is applied to the top film surface at an approximate rate of 2 grams per square foot. Throw-back blades are located behind the spraying area to place soil on the edges of the coated film, preventing displacement of the film by wind.

If a film-oil system is selected which does not immediately weaken upon application of the oil, the oil could be applied to the soil side of the film and the film could then be placed over the seed bed. Modifications of the above apparatus and procedures will be readily apparent to those skilled in the art. For instance, the oil may be applied by brushing or wiping.

Other components can be blended with polyethylenes and elastomers in forming the films. Thus, pigments, prooxidant catalysts, plasticizers, fillers, fertilizers, insecticides, and the like can be incorporated in the film. Pigments such as carbon black can be used to regulate the amount and kind of light passing through the film. Representative of pro-oxidant catalysts which can be used to expedite film degradation upon exposure to the elements are the manganese and cobalt naphthenates and stearates. Moreover, an adhesive modifier such as that disclosed in parent application Ser. No. 60,724 may be formulated with the oil if the oil is to be applied on the soil side of the film.

The coated films of this invention can be effectively used as ground mulches for a variety of crops having widely varying growing seasons. They are particularly valuable in that they readily permit young emerging plant breakthrough. Thus, the films can be applied at an early stage after planting and holes do not have to be provided in the film to allow the plants to emerge. Moreover, after the growing season, the films do not have to be gathered up, raked, or burned as they degrade to a point that they can be conveniently plowed into the soil with regular tilling machinery.

The invention is further illustrated by the following examples wherein parts and percentages are by weight unless otherwise indicated. Examples 2–7 EPDM copolymer and polyethylene as identified in Example 1.

Example 1 EPDM - Polyethylene Films

Flat sheets of the mixes shown in Table 1 were made by pressing approximately 1 ½ grams of the mix between polyester films in a Preco Press at a temperature of 250°F. and a pressure of 15,000 psi for approximately ½ minute. The resulting films were about 7 inches square and approximately 2–4 mils thick.

The films were secured over the openings of 250 cc. beakers, and a paraffinic oil ("CITGO" 90103) was brushed onto the films at an application rate of approximately 2 grams per square foot. To simululate the force exerted by a weak seedling, a 5-gram round-ended rod (1/16 inch radius) was placed with the round end in contact with the oiled film surface. A similar 100-gram rod was used to simulate a strong growing seedling.

Films were prepared from smoked sheet natural rubber polyethylene blends using the same preparation, coating, and testing techniques reported in Example 1. A film was prepared from 25 parts smoked sheet, 75 parts polyethylene, and 15 parts paraffin wax. This film was not penetrated by a 5-gram weight during a one-hour test. An identical coated film was penetrated in 90 sec. by a 5-gram weight applied 48 hours after film coating.

Likewise, a film prepared from 25 parts smoked sheet and 75 parts polyethylene, and 30 parts paraffin wax was not penetrated by a 5-gram weight during a one-hour test, whereas the 5-gram weight penetrated the coated film in 15 seconds when applied 48 hours after film coating.

Example 4 - Butyl Rubber 268 - Polyethylene Films

Films were prepared from Butyl Rubber 268 and

TABLE 1

EPDM/POLYETHYLENE FILMS

| | Sample Number | | | | | | | |
|---|---|---|---|---|---|---|---|---|
| | 269 | 270 | 277 | 235 | 280 | 284 | 285 | 286 |
| EPDM Copolymer[1] | 25 | 50 | 50 | 30 | 25 | 17 | 25 | 25 |
| SBR — 1500[2] | — | — | — | — | — | 17 | — | 25 |
| Smoked Sheet[3] | — | — | — | 20 | — | 17 | 25 | — |
| Polyethylene[4] | 75 | 50 | 50 | 50 | 75 | 50 | 50 | 50 |
| Paraffin Wax[5] | 30 | 30 | — | 30 | — | — | — | — |

(1) 53% ethylene, 42% propylene, 3.3% 1,4-hexadiene.
(2) Cold, non-pigmented styrene-butadiene rubber, General Purpose.
(3) Natural Rubber, No. 1 Ribbed Smoke Sheet
(4) High pressure low density polymer having a melt index of 100 and a density of 0.922 grams per cc. at 20°C.
(5) No. 115 Refined, Atlantic Richfield; long-chain saturated hydrocarbons soluble in benzene.

TABLE 2

FILM PENETRATION TIMES

| | Sample Number | | | | | | | |
|---|---|---|---|---|---|---|---|---|
| | 269 | 270 | 277 | 235 | 280 | 284 | 285 | 286 |
| Uncoated Film with 5 g. Rod; 1 hour Max. | None | None | None | None | None | None | None | None |
| Uncoated film with 100 g. Rod; 1 hour Max. | None | 15 sec. | 3 min. | 90 sec. | 30 sec. | 90 sec. | 20 sec. | 30 sec. |
| Coated film with 5 g. Rod Immediate after coating | — | 8 to 19 hours | — | 6 hours | None after 6 days | 7 hours | Between 8 & 23 hrs. | Between 8 & 23 hrs. |
| Coated film with 5 g. Rod, 48 hours after coating; 6 days Max. | None | 6 min. | None | 3 min. | None | 90 min. | 7½ hrs. | 6 hrs |
| Coated film with 100 g. Rod, 6 days after coating | 25 sec. | — | 20 sec. | — | 12 sec. | — | — | — |

Example 2 - Styrene-Butadiene Rubber - Polyethylene Films

Films were prepared from styrene butadiene rubber-polyethylene blends. Film preparation, coating, and testing techniques were as described in Example 1. A film prepared from 25 parts SBR 1500, 25 parts Smoked Sheet natural rubber, and 50 parts polyethylene coated with paraffin oil was penetrated in 2 minutes by a 5-gram weight applied 48 hours after film coating. The same film, uncoated, was not penetrated during a one-hour test with a 5-gram weight.

Likewise, a film was prepared from 25 parts SBR 1500, 75 parts polyethylene, and 15 parts paraffin wax. While the uncoated film was not penetrated by a 5-gram weight during a one-hour test, the 5-gram weight penetrated the coated film in 90 sec. when applied 48 hours after film coating.

Example 3 - Natural Rubber - Polyethylene Films polyethylene blends using the same preparation, coating, and testing techniques reported in Example 1. A film was prepared from 25 parts butyl rubber, 75 parts polyethylene, and 30 parts paraffin wax. This film was not penetrated by a 100-gram weight in a one-hour test. The same film, when coated, was penetrated by a 5-gram weight in 22 hours and was immediately penetrated by a 100-gram weight applied 6 days after film coating.

Example 5

The film identified as sample number 235 in Example 1, representing the preferred class of films used in practicing this invention, was tested with other petroleum derivative oils. "Shellflex" 412 was found to give approximately equivalent results to the "Citgo" 90103 oil. "Sundex" 790, an aromatic oil, was found to soften the film at a slower rate than the "Citgo" 90103 oil.

Mineral oil, a refined petroleum distillate, also gave equivalent results to the "Citgo" 90103 oil.

Example 6

A film formulated according to recipe 235 of Example 1 was coated on the bottom side with a paraffinic oil ("Citgo" 90103) at a rate of approximately 4 grams per square foot as the film was being applied to freshly planted seed beds. The seed beds were planted with lettuce, onion, and watermelon seeds. Portions of the film were left uncoated for comparison.

Seedlings of lettuce, onion, and watermelon readily penetrated the oil coated portions of the film as the seeds germinated, but did not penetrate the uncoated film. After 60 days the mulch film had sufficiently degraded that it was readily disced into the soil.

Example 7

The effect of an adhesive-modifier composition on the seedling penetration and plant degradation properties of films of this invention is illustrated as follows:

An adhesive-modifier is prepared by mixing 5 parts of a terpolymer of ethylene, propylene, and 1,4-hexadiene (containing about 70–75 percent by weight ethylene and about 3 percent by weight diene) and 95 parts of solvent-refined neutral paraffin oil ("Citgo" 90103), and mixing 70 parts of this EPDM/oil mixture with 30 parts of trichloroethylene.

Two film samples are prepared by blending the following ingredients on a two-roll mill as described in Part A of Example 1 and fabricating the blend into $29\mu$ films by flat die extruder drawing.

|  | Parts By Weight | |
|---|---|---|
| EPDM Copolymer as described in Example 1 | 30.8 | 23.2 |
| No. 1 Ribbed Smoked Sheet | 15.2 | 15.2 |
| Polyethylene | 30.8 | 38.4 |
| Paraffin Wax as described in Example 1 | 23.2 | 23.2 |

Strips of film about 15 centimeters wide are applied over cabbage and pea beds at the University of California, Riverside, California. The films were coated with the adhesive-modifier by a transfer roll laying device, and the coated films were pressured onto the soil by a sponge roller.

Seedlings readily penetrated both films, and both films had within 60 days degraded to the point of easy disposal by discing into the soil.

I claim:

1. A method of protecting sprouting seeds planted in the soil, said method comprising covering the soil area where said seeds are planted with a polyethylene-hydrocarbon elastomer mulch film having improved plant penetration, said film being formed of a blend of:

1. about 50–75 parts by weight of polyethylene or a copolymer of ethylene with up to about 5 percent by weight of a $C_3$–$C_{10}$ alpha-olefin,
2. about 25–50 parts by weight of hydrocarbon elastomer, and
3. about 0–30 parts by weight of paraffinic wax;

said film being coated with a composition containing a petroleum-derived rubber processing and extender oil.

2. The method of claim 1 wherein said oil is at least one of naphthenic oil, liquid petrolatum, paraffinic oil, or mineral oil.

3. The method of claim 2 wherein said hydrocarbon elastomer is at least one of natural rubber, butadiene-styrene copolymer, butadiene, butyl rubber, cis-polyisoprene, or ethylene-propylene copolymer.

4. The method of claim 2 wherein said mulch film is a blend, in parts by weight, of 1. about 16–40 parts of an ethylene polymer,
2. about 10–50 parts of a substantially amorphous ethylene-propylene copolymer.
3. about 15–30 parts of natural rubber, and
4. about 20–26 parts of paraffin wax.

5. The method of claim 2 wherein said oil is applied at a rate of 2 to 4 grams of oil per square foot of film surface.

* * * * *